(12) United States Patent
Page et al.

(10) Patent No.: US 7,715,429 B2
(45) Date of Patent: May 11, 2010

(54) INTERCONNECT SYSTEM FOR SUPPLY CHAIN MANAGEMENT OF VIRTUAL PRIVATE NETWORK SERVICES

(75) Inventors: David J. Page, Bath (GB); Philip Martin Halstead, Holyport (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1188 days.

(21) Appl. No.: 11/003,456

(22) Filed: Dec. 6, 2004

(65) Prior Publication Data

US 2006/0165087 A1 Jul. 27, 2006

(51) Int. Cl.
*H04J 3/16* (2006.01)
(52) U.S. Cl. ............. 370/465; 370/392; 370/395.5; 370/401
(58) Field of Classification Search ............. None
See application file for complete search history.

(56) References Cited

U.S. PATENT DOCUMENTS

| | | | |
|---|---|---|---|
| 5,825,772 A | 10/1998 | Dobbins et al. | |
| 6,084,892 A | 7/2000 | Benash et al. | |
| 6,216,117 B1 | 4/2001 | Hall | |
| 6,473,404 B1 * | 10/2002 | Kaplan et al. | 370/238 |
| 6,577,327 B1 | 6/2003 | Rochford et al. | |
| 6,614,781 B1 * | 9/2003 | Elliott et al. | 370/352 |
| 6,650,632 B1 | 11/2003 | Volftsun et al. | |
| 6,662,221 B1 | 12/2003 | Gonda et al. | |
| 6,941,380 B2 | 9/2005 | Cunningham | |
| 6,944,183 B1 | 9/2005 | Iyer et al. | |
| 7,072,346 B2 * | 7/2006 | Hama | 370/395.53 |
| 7,120,165 B2 * | 10/2006 | Kasvand-Harris et al. | 370/466 |
| 7,133,417 B1 * | 11/2006 | Kao et al. | 370/467 |
| 7,154,901 B2 * | 12/2006 | Chava et al. | 370/401 |
| 7,237,138 B2 | 6/2007 | Greenwald et al. | |
| 7,263,597 B2 | 8/2007 | Everdell et al. | |
| 7,272,146 B2 * | 9/2007 | Yamauchi | 370/395.53 |
| 7,369,556 B1 * | 5/2008 | Rekhter et al. | 370/392 |
| 7,426,210 B1 | 9/2008 | Miles et al. | |
| 7,433,359 B2 * | 10/2008 | Havela et al. | 370/395.5 |
| 7,483,411 B2 | 1/2009 | Weinstein et al. | |
| 2002/0039352 A1 | 4/2002 | El-Fekih et al. | |
| 2002/0087713 A1 | 7/2002 | Cunningham | |
| 2002/0136376 A1 | 9/2002 | Fleischer et al. | |
| 2003/0055990 A1 | 3/2003 | Cheline et al. | |
| 2003/0123446 A1 | 7/2003 | Muirhead et al. | |
| 2004/0196858 A1 | 10/2004 | Tsai et al. | |
| 2006/0203820 A1 * | 9/2006 | Coluccio | 370/392 |
| 2007/0286198 A1 | 12/2007 | Muirhead et al. | |

FOREIGN PATENT DOCUMENTS

| | | |
|---|---|---|
| EP | 0 666 670 | 12/1994 |
| EP | 1 111 840 | 6/2001 |

(Continued)

OTHER PUBLICATIONS

PCT Int'l Search Report, Jun. 10, 2005.

(Continued)

*Primary Examiner*—Michael J Moore, Jr.

(57) ABSTRACT

An interconnect system for the supply chain management of network services, preferably virtual private network services, provides a networking architecture and interface usable in delivering substantially measurable virtual private network services involving multiple carriers.

22 Claims, 6 Drawing Sheets

FOREIGN PATENT DOCUMENTS

| WO | WO 98/36369 | 8/1998 |
| --- | --- | --- |
| WO | WO 00/11885 | 3/2000 |
| WO | WO 00/22792 | 4/2000 |
| WO | WO 00/72183 | 11/2000 |
| WO | WO 01/14983 | 3/2001 |
| WO | WO 01/17169 | 3/2001 |
| WO | WO 01/31857 | 5/2001 |
| WO | WO 01/60000 | 8/2001 |
| WO | WO 03/055153 | 7/2003 |

OTHER PUBLICATIONS

PCT International Search Report, issued on Jun. 10, 2005 in PCT International Application No. PCT/GB2004/005102. (Total 3 pages).

PCT International Preliminary Report on Patentability (1 page); Written Opinion of the International Searching Authority (7 pages); all mailed on Jun. 13, 2007 in PCT International Application No. PCT/GB2004/005102. (Total 8 pages).

EP Communication Pursuant to Article 96(2) EPC (1 page); Examination Report Reasons/EPO Form 2906 01.91CSX (8 pages); all mailed on Aug. 16, 2007 in EPO Application No. 04 805 930.7.(Total 9 pages).

European Search Report for EP Application No. EP 02 79 0678, mailed on Sep. 27, 2005 (Total 4 pages).

PCT Invitation to Restrict or to Pay Additional Fees mailed on May 24, 2004 in PCT International Application No. PCT/IB02/05776. (4 pages).

PCT Written Opinion mailed on Mar. 17, 2004 in PCT International Application No. PCT/IB02/05776 (Total 2 pages).

PCT Notification Concerning Documents Transmitted (1 page); International Preliminary Examination Report (1 page); International Preliminary Examination Report—Separate Sheet (6 pages); Notification Concerning Transmittal Of The International Preliminary Examination Report (1 page); International Preliminary Examination Report—Separate Sheet (3 pages); International Preliminary Examination Report (4 pages); Written Opinion; all mailed in PCT International Application No. PCT/IB02/05776 on Jul. 7, 2009 (18 pages).

International Search Report issued in PCT International Application No. PCT/IBO2/05776 dated Oct. 28. 2003 (5 pages).

Notification Of Reason For Rejection, issued by the Japan Patent Office (Translation); issued on Feb. 5, 2008 in Japan Patent Application No. 2003/555,750 (4 pages).

Final Decision For Rejection, issued by the Japan Patent Office (Translation), issued on Jul. 1, 2008 in Japan Patent Application No. 2003/555,750. (1 page).

Lewis, Lundy, *Spectrum Service Level Management Definition, Offerings, and Strategy*, Mar. 30, 1998, XP-002150696, Technical Note ImL-ctron-98-02, Mar. 30, 1998 (18 pages).

Graham Chen, Kong Qinzheng Kong, *Integrated Management Solution Architecture*, NOMS 2000, IEEE/IFIP Network Operations an Management Symposium "The Networked Planet: Management Beyond 2000", IEEE 2000 (pp. 217-230) (Total 32 pages).

Langer, Michael; Nerb; Michael,. *An ODP Enterprise Specification of Customer Service Management for Connectivity Services*, Proceedings Third International Enterprise Distributed Object Computing Conference, 1999, EDOC 99. University of Manneheim, Germany Sep. 27-30, 1999 (pp. 94-102) (14 pages).

Ford, Juanita C; Girardi, Philip G Ph.D.; *Proactive Network Design*, Aerospace Conference, 1999 IEEE Aerospace Conference Proceedings, vol. 5 of 5, Mar. 6, 1999 (pp. 113-130) (24 pages).

Image File Wrapper for U.S. Appl. No. 10/322,322, filed Dec. 17, 2008 and entitled *System for Supply Chain Management of Virtual Private Network Services* and published as U.S. Application Publication No. US 2003/0123446 A1.

Image File Wrapper for U.S. Appl. No. 11/790,842, filed Apr. 27, 2007 and entitled *System for Supply Chain Management of Virtual Private Network Services* and published as U.S. Patent Application Publication No. US 2007/0286198 A1.

International Search Report issued in PCT International Application No. PCT/IB02/05776 dated Oct. 28, 2003 (5 pages).

* cited by examiner

INTERCONNECT SYSTEM FOR SUPPLY CHAIN MANAGEMENT OF VIRTUAL PRIVATE NETWORK SERVICES

FIELD OF INVENTION

The present invention generally relates to the field of network grid architecture. More particularly, the present invention relates to the architecture and its configuration in delivering managed virtual private networks (VPNs) and VPN services involving multiple carriers.

BACKGROUND OF INVENTION

As more and more people rely on the ability to communicate data electronically, there is a growing dependency by firms and organizations on the computer networks used to connect its users to each other. For many businesses that have geographically distributed employees, customers and strategic partners, integrating and on-going management of the corporation's computer networks is a major and increasing challenge.

In general, global businesses and organizations have disparate requirements for data network services. There are several approaches to solving a business' network service requirements. One approach is to interconnect a company's offices or various site locations with dedicated or private communication connections via a wide area network (WAN).

An advantage of this traditional approach to building a customized private network is that it is generally owned and managed by the corporation; management of the network along with control of computing resources, is centralized. Another advantage is improved security of the network against unauthorized access.

However, a major disadvantage of a corporate-owned and controlled private network is the extremely high total cost of procurement, design, implementation, operations, management, skill retention, and facilities related to private networks. Also, private corporate networks are oftentimes underused as the dedicated resources must be configured to handle the peak capacity requirements of the business.

In an attempt to reduce costs and enhance their competitiveness, some companies chose to deploy some business applications over the public Internet, a second approach to solving a business' network service requirements. In other words, rather than undergoing the considerable expense of constructing a private network of dedicated communication lines, some companies opt to employ the Internet to facilitate communication between various remote sites.

An advantage of using the Internet as a transport mechanism is the Internet's ubiquity; Internet access is worldwide. It is also convenient. However, a major disadvantage is that the Internet is a public network. Data propagation is indeterminate, security is relatively low and performance is not guaranteed. Electronic communications are susceptible to interception, modification and replication by third parties, essentially compromising proprietary and confidential internal corporate communications.

Because the potential business related damage resulting from security breaches and unreliable performance has become such a critical factor in network services, companies often seek an alternative solution to the Internet to obtain virtual private network (VPN) services with a high degree of security and performance assurance.

As a practical matter, there are two approaches to providing VPN services today: "on-net" or "off-net". These VPN services are generally a premium service offered by a service provider where a firm or business contracts with the service provider for a specified VPN service.

In the on-net approach, typically a service provider offers VPN service on its own network infrastructure only. An advantage of on-net service is that it does not require collaboration among multiple service providers, and generally uses standard service provider products and services only. However, a major drawback is the limited reach of a sole service provider's network. One service provider on its own often cannot offer service to corporate sites in all cases.

When a subscriber's requirements extend beyond the service provider's infrastructure, an off-net approach is used that sometimes employs the Internet to provide basic, easy-to-implement and easy-to-administer off-net capabilities. Alternatively, two or more service providers may collaborate which may involve some integration of transport networks, operations systems and business systems. Of course, a service provider may choose to extend its reach by building its own network to reach the off-net sites. But this often proves expensive.

The problem with one or more of the above-mentioned conventional approaches is difficulty of implementation. Significant time and coordination is required to arrange new service provider partnership(s), and to interconnect network (s) and/or technologies and/or configurations and/or operations systems and/or business systems. For example, a service provider must undertake to coordinate field support of off-net gateways with one or more third party groups. Additionally, the integration of operational and business systems to make the collaboration viable is complex and costly. Moreover, once set-up, the complex interconnections are difficult to change.

Another problem in one or more of the prior art approaches is the significant investment of financial resources. The cost of implementing and maintaining an off-net computer network, for example, is high. These high costs are compounded by the high costs for long distance charges for leased lines and switched services. In addition, the number of support staff necessary to manage these networks further increases the costs to manage them.

Yet another problem in one or more of the prior art approaches is non-deterministic route propagation. The route by which data communications travel from point to point over a public network, such as the Internet, can vary on a per packet basis, and is essentially indeterminate. This prevents per customer design, implementation and monitoring, essentially preventing a service being engineered to meet an individual customer's need. It also prevents differentiation between customers because per-customer state/status is not maintained throughout the network.

Yet another problem in one or more of the prior art approaches is unreliable network performance. There are little or no controls in the way that users use the Internet, for example. This generally means that one customer's use of the Internet may be adversely affected by another customer, for instance.

Yet another problem in one or more of the prior art approaches is the low level of data security. The data protocols for transmitting information over a public network, such as the Internet, are widely known. Consequently, electronic communications over the Internet are susceptible to interception. Packets can be replicated or even modified by unauthorized users.

Yet a further problem in one or more of the prior art approaches is significant delays in restoring service to customers. A significant number of performance-related faults occur at the interface between the off-net gateway and the off-net transport service, for instance. These problems prove very difficult to resolve and, again, the extending service provider must undertake to coordinate fault resolution with the off-net transport supplier.

Yet a further problem in one or more of the prior art approaches is lack of effective monitoring to determine whether one or more service providers are providing acceptable or unacceptable service. This creates a bottleneck for proper billing, settlement, fault-finding and fault resolution.

Yet a further problem in one or more of the prior art approaches is lack of service guarantees provided to customers. Fault resolution, a service guarantee highly valued by corporate customers, is often haphazard, without procedure, based on goodwill, and of indeterminate duration. This generally results in unacceptably long delays for VPN service to be properly restored.

These and other problems are shortcomings for which there is a need to overcome.

GLOSSARY

The detailed description of the present invention that follows may be easier understood by presentation of the following basic concepts about computer-to-computer communications and virtual private networks, in alphabetical order.

ATM (Asynchronous Transfer Mode) is a network technology capable of transmitting data, voice, audio, video, and frame relay traffic in real time. The basic unit of ATM transmission is referred to as a cell, which is a packet consisting of 5 bytes of routing information and a 48-byte payload (data).

Collocation Facility is best described as a secure facility where two or more service providers or disparate network fabrics may co-exist.

CoS (Class of Service) is a term used to refer to a category or subdivision of service, often by application type, of required quality of service performance.

CoS Mediation refers to the switch software that performs mediation between the different class-of-service mechanisms associated with the VPN types that it supports. This includes class-of-service mapping between two networks of the same VPN type that uses different class-of-service values.

EBGP (Exterior Border Gateway Protocol) is a protocol for distributing information regarding availability of the routers and gateways that interconnect networks.

End-to-end Service refers to the total service provided by an agreement between a subscriber and a provider. End-to-end service may comprise many network service sub-components in the context of a supply chain.

Frame Relay is a packet-switching protocol for use on wide area networks (WANs). Frame relay transmits variable-length packets over predetermined, set paths known as permanent virtual circuits. It is a variant of X.25 but dispenses with some of X.25's error detection and flow control for the sake of speed.

IPSec (Internet Protocol Security) generally refers to the security of the protocol standard within Transmission Control Protocol/Internet Protocol (TCP/IP) that governs the breakup of data messages into packets, the routing of packets from sender to destination network and station, and the re-assembly of packets into original data messages at the destination.

L2TP (Layer 2 Tunneling Protocol) is a set of rules or standards that governs the method of transmission of a wrapped packet. In tunneling, a packet based on one protocol is wrapped or encapsulated into a second packet based on whatever differing protocol is needed in order for it to travel over an intermediary network. This method of packet transmission is used to avoid protocol restrictions.

Martini or Kompella Draft is a document produced by the Internet Engineering Task Force (IETF) for the purpose of discussing a possible change in standards that govern the transport of Layer 2 frames over MPLS.

MPLS (Multi-Protocol Label Switching) is a communications method that uses multi-protocol labeling to establish a link or to route information between two parties. The labeling process generally involves attaching information associated with the permission level of the requesting process to an incoming or outgoing data message.

QoS (Quality of Service) is the required or desired level of network performance, often characterized by key attributes, such as bandwidth, delay, jitter, loss and the like.

SDH (Synchronous Digital Hierarchy) is a high-speed network that provides a standard interface for communications carriers in Europe to connect networks based on fiber-optic cable. It is designed to handle multiple data types such as voice, video, etc. It is an International Telecommunications Union (ITU) recommendation implemented in Europe and similar to the Synchronous Optical Network (SONET) standard used in North America and Japan.

A Virtual Circuit is a connection between communicating computers that provides the computers with what appears to be a direct link but can actually involve routing data over a defined, but longer path. A virtual circuit is not a physical entity; it is a logical entity. Multiple virtual circuits may exist across a single physical circuit.

VPN (Virtual Private Network) can be described as a wide area network (WAN) formed of permanent virtual circuits on another network, especially a network using technologies such as Asynchronous Transfer Mode (ATM), Multi-Protocol Label Switching or Frame Relay. It is also described as a set of nodes on a network that communicate in such a way that messages are safe from interception by unauthorized users as if the nodes were connected by private lines.

X.25 is one of a set of 'X series' recommendations for standardizing equipment and protocols used in public-access and private computer networks, adopted by the International Telecommunication Union Telecommunication Standardization Sector (ITU-T) and International Organization for Standardization (ISO). It defines the connection between a terminal and a packet-switching network by incorporating three definitions: (1) the electrical connection between the terminal and the network; (2) the transmission or link-access protocol; and (3) the implementation of virtual circuits between network users. Taken together, these definitions specify a synchronous, full-duplex terminal-to-network connection.

Technologies such as X.25, Frame Relay, Asynchronous Transfer Mode (ATM), MPLS, and Internet Protocol Security (IPSec), are well known VPN technologies.

In addition to the above, in the Detailed Description Section that follows, the description is presented, in part, in terms of program procedures executed on a computer or network device or network of computers. For completeness, it is to be understood that the instant invention is equally applicable to any customary network of computers. Such networks of computers, for example, include a standard communications protocol, such as Transmission Control Protocol/Internet Protocol (TCP/IP), Open Systems Interconnection (OSI) protocol, User Datagram Protocol (UDP), Wireless Application Protocol (WAP), and/or Bluetooth wireless communications protocol, or any other network-type protocol, local and/or global.

The procedural descriptions, representations or functionalities are generally conceived to be self-consistent sequence of steps leading to a desired result. For example, each step may involve physical manipulation of physical quantities, which takes the form of magnetic signals capable of being stored, transmitted, combined, compared and otherwise manipulated.

Additionally, the manipulations performed herein, such as capturing, outputting, provisioning, monitoring, maintaining, are often referred to in terms that may be associated with mental operations performed by a human. Human capability is not necessary, or desirable in most cases, in the operations forming part of the present invention; the operations are machine operations. Devices useful for performing operations of the present invention include networking devices, general-purpose computers or such similar electronic devices.

The present invention also relates to a system for performing these operations. This system may be specially constructed for its purpose or it may comprise a general-purpose computer as selectively activated or reconfigured by a software program.

SUMMARY OF INVENTION

It is a feature and advantage of the present invention to provide a networking architecture for configuring a virtual private network and/or interface that accomplishes substantially complete VPN membership decoupling.

It is a feature and advantage of the present invention to provide a networking architecture for configuring a virtual private network and/or interface that may replace expensive point-to-point WAN connections and dedicated hardware components.

It is a feature and advantage of the present invention to provide a networking architecture for configuring a virtual private network and/or interface that may replace low security Internet virtual private network and/or private network services.

It is a feature and advantage of the present invention to provide a networking architecture for configuring a virtual private network and/or interface that may replace unreliable performance Internet virtual private network services.

It is a feature and advantage of the present invention to provide a system and/or method for configuring a virtual private network and/or interface that may resolve expensive single managed VPN services.

It is a feature and advantage of the present invention to provide a networking architecture for configuring a network interface, usable in a virtual private network, that facilitates decoupled mediation of network services between one or more carriers.

It is a feature and advantage of the present invention to provide a networking architecture for configuring a network and/or interface that facilitates quality-of-service management functions.

It is a feature and advantage of the present invention to provide a networking architecture for configuring a network grid and/or interface that facilitates (discrete) passive and active measurement and testing throughout the network.

It is a feature and advantage of the present invention to provide a networking architecture for creating and managing an end-to-end supply chain of service providers and network operators to deliver a desired virtual private network.

It is a feature and advantage of the present invention to provide a networking architecture for configuring a virtual private network and/or interface that manages the forwarding, routing and quality-of-service differences at network interconnections of disparate service providers.

It is a feature and advantage of the present invention to provide a networking architecture for configuring a virtual private network and/or interface that requires minimal levels of integration between participants in the supply chain.

It is a feature and advantage of the present invention to provide a networking architecture for configuring a virtual private network and/or interface that may supplement a private network by reducing the private network's load to acceptable levels.

It is a feature and advantage of the present invention to provide a networking architecture for configuring a virtual private network and/or interface that may handle the introduction of user requirements in the form of new software applications without disturbing the existing configuration of the network.

It is a feature and advantage of the present invention to provide a networking architecture for configuring a virtual private network and/or interface that allows systems integrators, service providers and other entities, to extend end-to-end, service level agreement-based (SLA-based) VPNs beyond their own infrastructure.

It is a feature and advantage of the present invention to provide a networking architecture for constructing a virtual private network on a per customer basis.

It is a feature and advantage of the present invention to provide a networking architecture for constructing a virtual private network that has a closed-loop control system for service delivery.

It is a feature and advantage of the present invention to provide a networking architecture for constructing a virtual private network that employs a router/gateway approach.

It is a feature and advantage of the present invention to provide a networking architecture for constructing a virtual private network that is easily scalable.

It is a feature and advantage of the present invention to provide a networking architecture for constructing a virtual private network that enables a single point of responsibility and accountability for delivery and performance of the network.

The present invention solves the problems in one or more of the prior art approaches and provides the above-mentioned and other features and advantages, by providing a networking architecture for constructing a virtual private network in such a way that minimizes the coordination, time and expense involved in producing and delivering managed virtual private networks and VPN services, including such networks and services involving multiple carriers.

A preferred embodiment of the architecture of the present invention, usable in a virtual private network, is created using packet-based data that is preferably, but not necessarily, propagated through a peering point. Alternatively and optionally, non-packet data technology, such as Layer 2 technologies (i.e. Frame Relay and ATM) or time-division multiplexing, may be used.

One or more peering points are connected to each other in a desired configuration, such as a string, where, for example, one end of the string (or strings) is connected to a corporation's headquarter office and the other end of the string (or strings) is connected to a location other than the headquarter office. The configuration of the string or strings, stemming from one or many end points to one or many other end points, constitutes an end-to-end supply chain. In this regard, the term supply chain generally refers to the physical instantiation or configuration of a chain of suppliers comprising one or more service providers and network peering points.

Each peering point may be referred to as a virtual private Network Peering Point (NPP), which comprises network hardware and/or software configured in part as a VPN service performance monitoring device. Each peering point or NPP preferably employs Multi-Protocol Label Switching (MPLS) and Ethernet technology, which allows communications with similar or dissimilar VPN transport technologies.

Through the networking architecture of the present invention, each NPP is connected to one or more service providers, essentially facilitating multi-lateral service provider inter-connectivity. One type of inter-connectivity service involves providing connectivity between peering points. In order to facilitate the connection between two or more peering points, transit gateways are employed. Another type of inter-connectivity service involves providing connectivity between subscriber site(s) and peering point(s). Here, distribution gateways are used.

An interconnect domain for providing substantially complete decoupled mediation of network services between one or more carriers connected to a communications network, is disclosed. The interconnect domain includes: one or more collocation facilities, each having a network device configured to decouple connectivity of one or more carriers to the communications network, and at least one gateway associated with the network device; a route propagation system in communication with at least two gateways in one or more collocation facilities, where the propagation system comprises routers where routing information is hosted for distribution through the communications network; a management network in communication with one or more networking elements of the network device and the route propagation system to facilitate managed operation of the network device and the route propagation system; and at least one pair of single interfaces each configured with substantially the same specification for the removal of network membership information and/or specified distribution protocols from each interface.

The interconnect domain further enables: a gateway to carrier interconnect that substantially allows a carrier to connect to at least one of one or more network devices and one or more pairs of network devices; a gateway to gateway interconnect that substantially allows forwarding of site traffic across one or more single logical interfaces; a gateway to gateway interconnect that substantially allows for scalability of the communications network through separated data forwarding from route distribution; a gateway to gateway interconnect that substantially allows for logical separation of one or more grouping of site routing and forwarding information between gateways; a gateway to carrier interconnect that substantially allows for decoupling of network membership schemas; a gateway to carrier interconnect that allows for substantially secure connections on the gateway to carrier interconnect substantially absent denial of service attack; a gateway to carrier interconnect that substantially allows for separation of one or more gateway interfaces from one or more carrier interfaces; a gateway to carrier interconnect that allows for substantially separated ownership of a gateway from a carrier; a gateway to carrier interconnect substantially allowing for support of advanced network services including multi-carrier network enabled multicast.

The route propagation system of the interconnect domain: creates substantially mirrored route propagation paths allowing for substantially no single point of failure in the hosted routing; allows for grouping of one or more sites or site groups per carrier; allows for grouping on one or more sites or site groups per network; allows traffic from a grouping of one or more sites or site groups to ingress or egress a carrier as desired; allows for one or more carriers each network routing and forwarding over a single interface to be associated with a subset of one or more sites within the communications network or with all network sites.

The interconnect domain further enables: an interconnect that substantially allows a carrier to restrict per VPN the number of routes learned from or advertised to one or more carriers; an interconnect that substantially a carrier to summarize per VPN routes learned from or advertised to one or more carriers; an interconnect that substantially allows a carrier to load balance traffic across one or more networking devices; a single gateway router configuration that allows any IP based VPN carrier to connect to a service grid.

An interconnect domain for providing performance-based network services, is also disclosed. The interconnect domain comprises: at least one pair of single interfaces, each interface substantially similarly configured, for the removal of network membership information and/or specified distribution protocols from the interface, resulting in substantially complete routing separation over the interconnect domain; one or more collocation facilities, each having a network device to standardize connectivity of one or more carriers to a communications network, and at least one gateway associated with each network device; a route propagation system in communication with at least two gateways in one or more collocation facilities, the propagation system comprising routers where routing information is hosted for distribution through the communications network; and a management network in communication with one or more networking elements of the network device and with the route propagation system to facilitate operation of the network device and the route propagation system.

A system for providing substantially measurable network service across an interconnect domain connecting one or more carriers to the interconnect domain, is also disclosed. The system has: one or more carrier domains connected in a way that each carrier domain is logically separated therefrom, each carrier domain comprising a carrier's network backbone, and a pair of routers in communication with the network backbone; and at least one interconnect domain comprising at least one collocation facility, which has a network device and one or more gateways associated with the network device, a route propagation system for managing and controlling route propagation functions, a management network in communication with the network device and route propagation system, and a pair of substantially similar single interfaces for separating at least one of the carrier domain from the interconnect domain, the carrier domain from another carrier domain, or the interconnect domain from another interconnect domain. The route propagation system allows for traffic to fail over one of the interconnect domain and carrier domain as directed.

The configuration of the networking architecture of the present invention enables service provider-dual homing, which allows subscriber traffic to egress and ingress a service provider at a pair or multiples of pairs of NPPs. In this configuration, the pairs of NPPs are referred to as North and South NPPs, respectively. Each North and South NPP has a connection, referred to as a North and South connection, respectively, carried by participants in the supply chain, such as to another pair of NPPs or a subscriber gateway. The selection of which single NPP is used at any one time to forward subscriber traffic and propagate subscriber routing, is preferably a function of the service provider's routing protocols. The service provider may then optimize these traffic paths through load balancing or selectively determining individual traffic egress points.

The selection of which pair(s) of NPPs is/are used at any one time to forward subscriber traffic and propagate subscriber routing is preferably directed by an interconnect manager. In this embodiment, the interconnect manager preferably operates the NPPs along with the route propagation system.

The configuration of each NPP also allows for MPLS Label Switched Path (LSP) protection, which preferably exists between the gateways and resides with the interconnect manager. Selection of the backup path is dynamic such that backup path selection (data convergence) is performed by the gateways, based on directed paths that exist between the NPPs.

With respect to routing, each NPP is configurable to support a variety of route propagation methodologies for interconnecting service providers. For example, one route propagation method the NPP is configurable to support is a MPLS virtual router interconnection where one or more VPNs are interconnected using internet protocols (IP) over a single logical interface per VPN. In other words, the routing/data forwarding interconnect supported from a service provider domain to a peering point is an MPLS virtual router interconnection where one or more VPNs are preferably interconnected using internet protocols (IP) over logical interfaces per VPN. Another method may employ a multi-hop, multi-protocol Exterior Border Gateway Protocol (EBGP), where participant service providers use a transparent layer two (L2) VPN transport mechanism.

In addition, devices or routers are preferably centrally located in what may be termed a routing nexus. Multiple routers comprise the routing nexus, where subscriber routing information is hosted and selectively distributed to deliver virtual private networks. Preferably, a minimum of two routers is dedicated to each service provider for multi-protocol BGP route distribution. These routers are preferably divided between a minimum of two geographically distributed and secure operations centers.

Also, creating mirrored, separate route propagation paths for all subscriber routes is likely to increase route propagation availability. Principally, there is virtually no single point of failure in the supply chain.

In this respect, and before explaining at least one embodiment or aspect of the invention in detail, it is to be understood that the invention is not limited in its application to the details of construction and to the arrangements of the components set forth in the following description or illustrated in the figure drawings.

The present invention is capable of other embodiments and of being practiced and carried out in a variety of ways. For example, one embodiment falling within the scope of the claims may be described as a method of procuring VPN service. The method includes, in part, the steps of capturing subscriber requirements, formulating one or more solutions based on the subscriber's requirements, and formulating one or more price quotes based on a selected solution.

In another instance, the VPNs are not limited in the number of sites or the nature of inter-connectivity between sites; in other words, the present invention is not limited to point-to-point connections. It could be any combination of connectivities, such as point to multi-point or full mesh.

The present invention is also not limited to the number of peering points or service providers, illustrated herein, and used to comprise the supply chain. The number of peering points and/or service providers may reach into the hundreds, for example.

Also, it is to be understood that the phraseology and terminology employed herein are for the purpose of description and should not be regarded as limiting the invention. Those skilled in the art will appreciate that the conception, upon which this disclosure is based, may be readily used as a basis for designing other structures or infrastructures, methods and/or systems for carrying out the several purposes of the present invention and its several aspects. Therefore, it is important that the claims be regarded as including such equivalent constructions and/or structures insofar as they do not depart from the spirit and scope of the present invention.

The above features and/or advantages of the invention, together with other aspects of the invention, along with the various features of novelty that characterize the invention, are pointed out with particularity in the claims appended to and forming a part of this disclosure.

BRIEF DESCRIPTION OF PREFERRED EMBODIMENTS

DETAILED DESCRIPTION OF PREFERRED EMBODIMENTS

Figure 1:
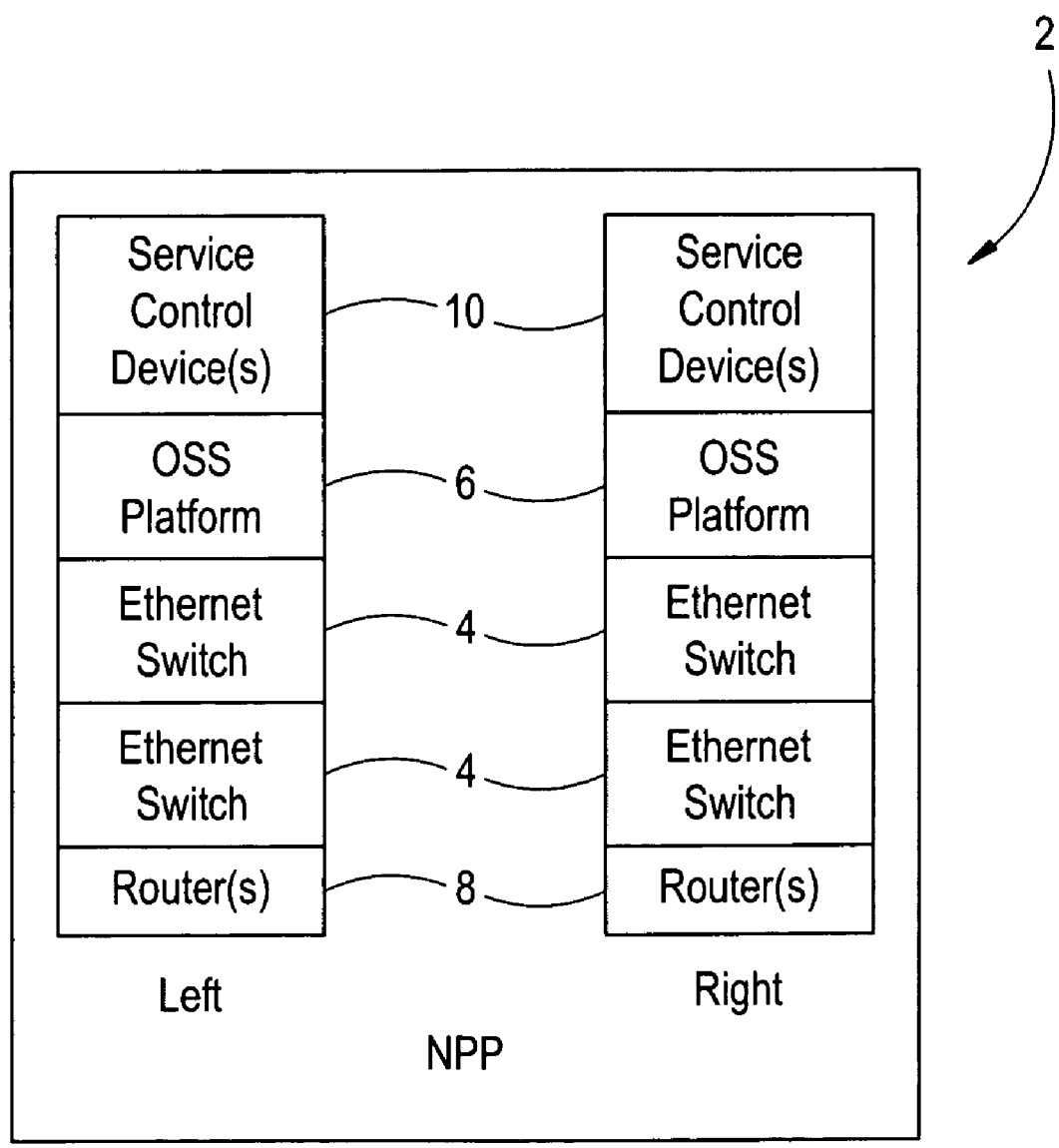
FIG. 1 is a block diagram of a configuration of a network peering point, usable in the networking architecture of the present invention.

The present invention relates to the construction and configuration of a networking architecture and interface, preferably usable in virtual private networks (VPN) and VPN services in the form of a supply chain. A supply chain generally refers to the physical instantiation or configuration of a chain of suppliers comprising one or more carriers and network devices/peering points, generally interconnected together. The networking architecture and interface of the present invention allows for a variety of applications.

For convenience, the description of the present invention will be explained with reference to the data environment, particularly packet-based data. Alternatively and optionally, non-packet-based data approaches, such as time-division multiplexing, are also applicable.

In accordance with the invention, a gateway is used to connect the subscriber's network environment to the networking architecture/interface configuration of the present invention. It is very common that the subscriber's environment is an Internet Protocol (IP) gateway or router.

In a best mode of the invention, each NPP is connected to one or more service providers, essentially providing multi-lateral service provider inter-connectivity. One type of inter-connectivity service involves providing connectivity between peering points. In order to facilitate the connection between two or more peering points, transit gateways are employed.

In a preferred embodiment, each transit gateway is arranged with and preferably connected to a peering point or NPP using a high speed Ethernet connection. The transit gateway, which is a network device preferably owned and/or managed by a service provider, has a NPP side and a transport side.

The NPP side of the transit gateway is substantially directly connected to the NPP. Each transit or service provider gateway is capable of transporting Ethernet frames on the NPP side. The transport side of the transit gateway is capable of connection to one or more transit gateways generally located at another NPP.

As such, on the transport side, the transit gateway is configurable to transparently tunnel Ethernet if applicable over a variety of different VPN transport technologies, such as Ethernet, MPLS, Frame Relay, ATM, SDH, and the like.

Another type of inter-connectivity service involves providing connectivity between subscriber site(s) and peering point(s). Here, distribution gateways are used.

In a preferred embodiment, each distribution gateway is arranged with and preferably connected to a peering point using a high speed Ethernet connection.

Each distribution gateway is arranged with and connected to the NPP using Ethernet or Gigabit Ethernet technology. The distribution gateway, which is a network device, has a NPP side and a transport side.

The NPP side of the distribution gateway is substantially directly connected to the NPP. Each distribution or service provider gateway operates Internet protocols over MPLS over Ethernet on the NPP side. The transport side of the distribution gateway is capable of connection to a subscriber's gateway, which comprises a customer's network equipment generally located at the customer's site.

As such, on the transport side, the distribution gateway is configurable to operate Internet protocols separated by link layer protocols such as Frame Relay, ATM, PPP and the like. Each NPP is preferably connected to two or more routers via a management network, all of which manages subscriber route propagation and enterprise traffic forwarding throughout the supply chain in conjunction with implementation systems.

Referring now to FIG. 1, there is shown a preferred embodiment of a configuration of a network peering point 2 usable in the networking architecture of the present invention. Each peering point 2 may be referred to as a Network Peering Point (NPP) 2. Each NPP is preferably arranged having a left rack and a right rack. Each NPP 2 comprises network hardware and/or software, including operating instructions. Preferably, each NPP includes right and left components for redundancy.

The network hardware and/or software preferably includes two Ethernet NPP switches 4, an operating system platform 6, such as an OSS platform, one or more routers 8, localized storage (not shown), and a service control device 10. The service control device(s) 10 enables the NPP 2 to operate, in part, as a VPN service performance monitoring device, and for quality-of-service management between connecting service providers.

Additionally, each NPP 2 preferably employs Multi-Protocol Label Switching (MPLS) and Ethernet technology, which allows the NPP 2 to communicate with similar or different VPN transport technologies on either side of the NPP 2. Communication with different VPN technologies is achieved by a combination of a service provider gateway, for instance, and normalization to MPLS. The NPP 2 is the fundamental building block of the virtual private network. The NPP 2 is also a fundamental component of a supply chain and delivery of the virtual private network.

Figure 2:
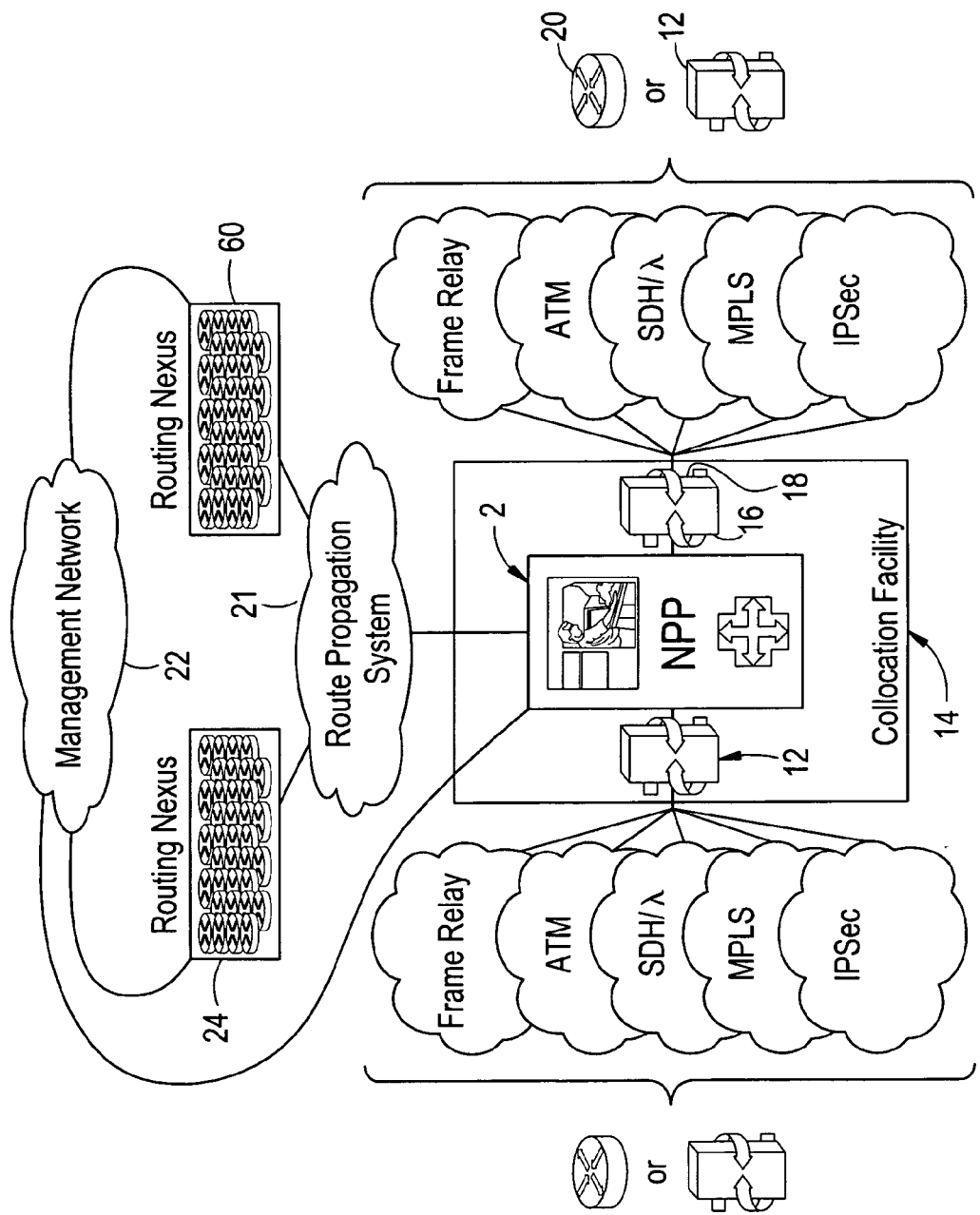
FIG. 2 is a block diagram showing a configuration of the peering point of FIG. 1 in one arrangement of a network node usable in the networking architecture of the present invention.

Referring now to FIG. 2, there is shown one configuration of the peering point of FIG. 1 in one arrangement of a network node usable in the networking architecture of the present invention. The principal components of the network node comprises a NPP 2, a management network 22, and a route propagation system 21 which includes one or more routing nexus 24, 60.

As depicted, the NPP 2 is preferably configured with two or more routers or gateways 12, 16 located on either side of the NPP 2.

The gateways 12 may take the form of a distribution gateway or a transit gateway, depending on the nature, geographical coverage, and role of the service provider in the supply chain. A distribution service provider provides localized, national or global coverage, and connects to the NPP 2 via a distribution gateway. Further, a distribution service provider provides managed IP service connectivity between a subscriber gateway 20 and a NPP 2.

On the other hand, a transit service provider provides layer 2 connectivity between NPPs 2. There may be one or more distribution service providers connected to each NPP 2. There may be one or more transit service providers connected to each NPP 2.

The distribution gateway 12, which is network hardware, has what may be termed as a NPP side 16 and a transport side 18. The NPP side 16 of the gateway 12 is in substantially direct connection to the NPP 2. Each gateway 12 is preferably capable of transporting Ethernet frames on the NPP side 16 for transporting site or enterprise traffic.

On the transport side 18, the gateway 12 is capable of operating Internet Protocols (IP) separated by whatever choice of technology the service provider desires. As depicted, the choice of technologies may include, but is not limited to, Frame Relay, Asynchronous Transfer Mode (ATM), SDH and IPSec. Accordingly, the transport side 18 is very flexible; it is capable of connection to another gateway 12, if it is a transit gateway, which indicates connectability to another peering point or NPP 2, or it is capable of connection to a subscriber's gateway 20, if it is a distribution gateway, which is generally located at the subscriber's premises.

A management network hardware and/or software 22 is in substantially direct connection with each NPP 2 to facilitate operation of the NPP 2, such as, for example, in-band management, route propagation, performance statistics, configurations, and the like. Given the reliable and redundant nature of the supply chain network configuration, substantially all connectivity to one or more remote NPPs 2 is in-band, essentially removing the need for an extensive and expensive global management network.

In addition, a route propagation system 21, in communication with one or more routing nexuses 24, 60, manages and securely controls subscriber route propagation and distribution. The route propagation system 21 and routing nexus 24, 60 operate substantially in connection with the management network 22.

Figure 3:
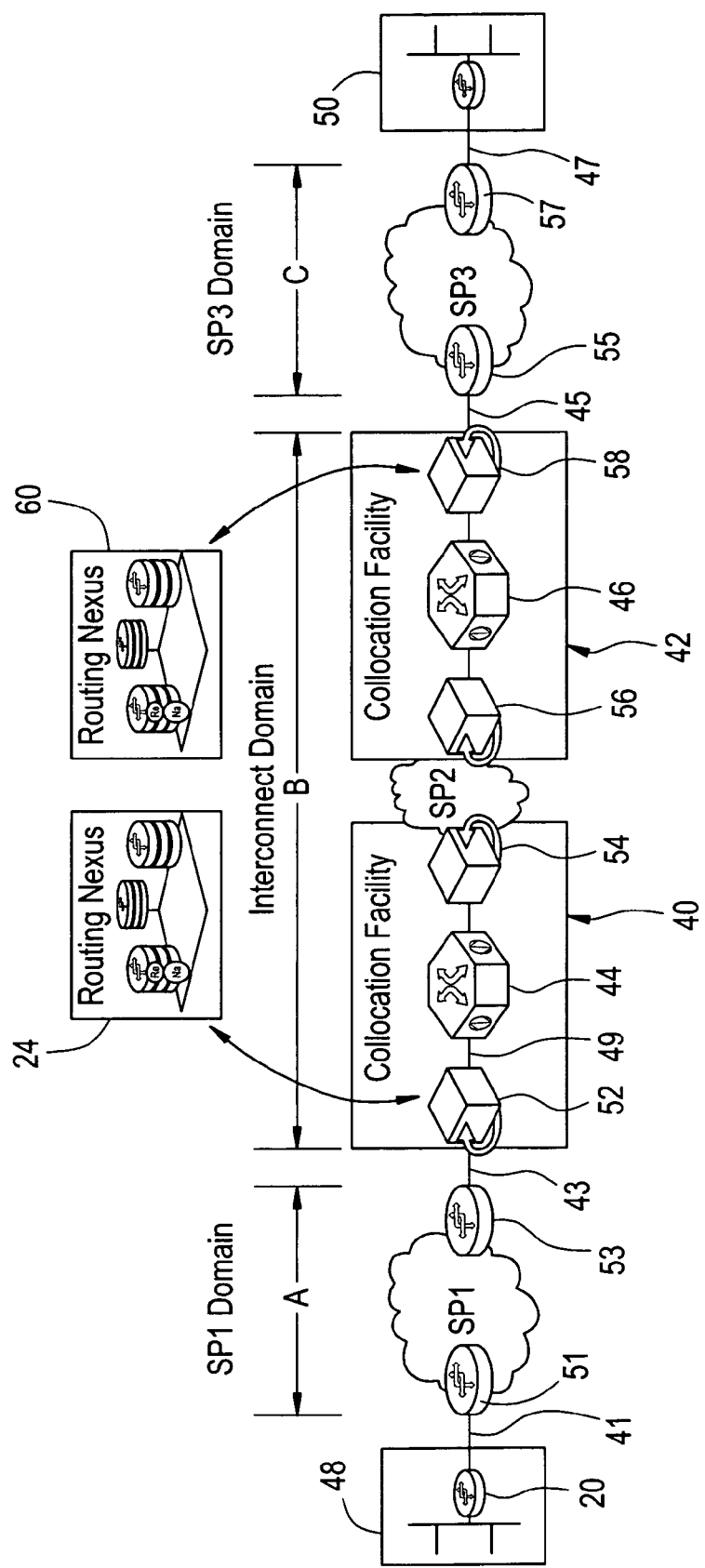
FIG. 3 is a block diagram showing a virtual private network employing the networking architecture of the present invention, in accordance with one embodiment of the present invention.

A virtual private network employing the networking architecture and interface of the present invention, is shown in FIG. 3.

As depicted, two collocation facilities 40, 42, each containing its own NPP 44, 46 respectively, are connected together via multiple service providers, $SP_1$, $SP_2$, $SP_3$ between two remote subscriber sites 48, 50. A more detailed description is provided below.

Each subscriber site 48, 50 generally comprises network equipment, including the subscriber's gateway 20, on the customer's premises. In providing VPN service from site 48 to site 50, the VPN architecture is configured as one or more interconnect domains A, B, C, to include a plurality of service providers intermediate each subscriber site 48, 50 and intermediate each collocation facility 40, 42.

More specifically, the subscriber site 48 communicates with site 50 through VPN connectivity involving interconnect domains A, B, C and interfaces 41, 43, 45, 47. Interconnect domain A describes the $SP_1$ domain, which comprises a pair of routers 51, 53 on either side of $SP_1$. Similarly, interconnect domain C describes the $SP_3$ domain, which comprises a pair of routers 55, 57 positioned on either side of the $SP_3$ backbone. The routers 51, 53, 55, 57 are preferably owned and/or operated by the respective service provider $SP_1$, $SP_3$.

The interconnect domain B includes an interconnect domain comprising collocation facility 40, 42 and a network backbone shown as $SP_2$. Within each collocation facility 40, 42 are contained two pairs of gateways 52, 54, and 56, 58, respectively. Gateways 52, 54, 56, 58 may be owned and/or operated by a service provider or providers. In other words, although the gateways 52, 58 may be dedicated to service provider $SP_1$, $SP_3$, respectively, these two gateways 52, 58 need not be owned by service provider $SP_1$, $SP_3$. Gateways 52, 54 are located on either side of the NPP 44 in collocation facility 40, and gateways 56, 58 are located on either side of the NPP 46 in collocation facility 42.

Preferably, gateways 52 and 58, which are in substantially direct communication with routing nexus 24, 60 are distribution gateways. Additionally, gateways 54 and 56, which connect the two collocation facilities 40, 42, are transit gateways, so called since they are managed and/or operated by transit service providers.

As depicted in FIG. 3, the distribution gateway 52 presents one or more transport interfaces on the transport side, toward the service provider $SP_1$, and provides Virtual Local Area Network (VLAN) Ethernet interfaces on the NPP side, toward the NPP 44. The main properties of the gateway 52 are protocol conversion, forwarding and route propagation. Preferably, the gateway 52 uses BGP and multi-protocol BGP (MBGP) route propagation.

The NPP 44, like the NPP 46, is preferably owned and/or operated by a NPP Operator, and includes Ethernet switches 4 (FIG. 1) used to interconnect two or more gateways 52, 54, for example. NPP switches 4 are used to establish connection-oriented paths between collocation facilities 40, 42. In addition, the NPP switches are used to establish substantially connectionless paths between routing nexus facilities 24, 60. Moreover, the NPP switches are also used to establish locally switched paths to local monitoring instrumentation devices.

The main properties of the NPP Ethernet switches 4 are forwarding, tunneling and MPLS traffic engineering. These switches provide one or more Ethernet transport interfaces to the gateways 52, 54 as appropriate, and maps VLANs and other virtual path mechanisms to MPLS Label Switched Paths (LSPs) where applicable. A range of Layer 3 IP VPN transport mechanisms, such as MPLS, ATM or Frame Relay, may be used by service providers $SP_1$, and $SP_3$, for their part of the forwarding path in the virtual private network. In addition, a range of Layer 2 VPN transport mechanisms, such as Ethernet, MPLS, Frame Relay, ATM or L2TPv3, may be used by service provider $SP_2$ for its part of the forwarding path in the virtual private network. These layer 2 VPN transport mechanisms appear as logical point-to-point circuits to the NPP switches 4.

The transit gateway 54, like the gateway 56, is likely owned and/or operated by the service provider $SP_2$. The main properties of the gateway 54 (and gateway 56) are protocol conversion and forwarding. Preferably, transit gateways 54, 56 do not perform route propagation. Transit gateway 54 provides one or more transport interfaces to the service provider $SP_2$ on the transport side, as well as VLAN Ethernet interfaces to the NPP 44 on the NPP side.

The above explanation is similar for the collocation facility 42, with the exception that the gateways 54, 56, likely owned and/or operated by the service provider $SP_2$.

The routing nexus 24, 60 are in substantially constant communication with the distribution gateways 52, 58 at the collocation facility 40, 42, respectively. Together, the routing nexuses 24, 60 acts as a dual redundant cluster of border routers where at least one router in each nexus 24, 60 is dedicated to and operates in conjunction with each service provider gateway and supports route propagation in accordance with conventional techniques.

Figure 4:
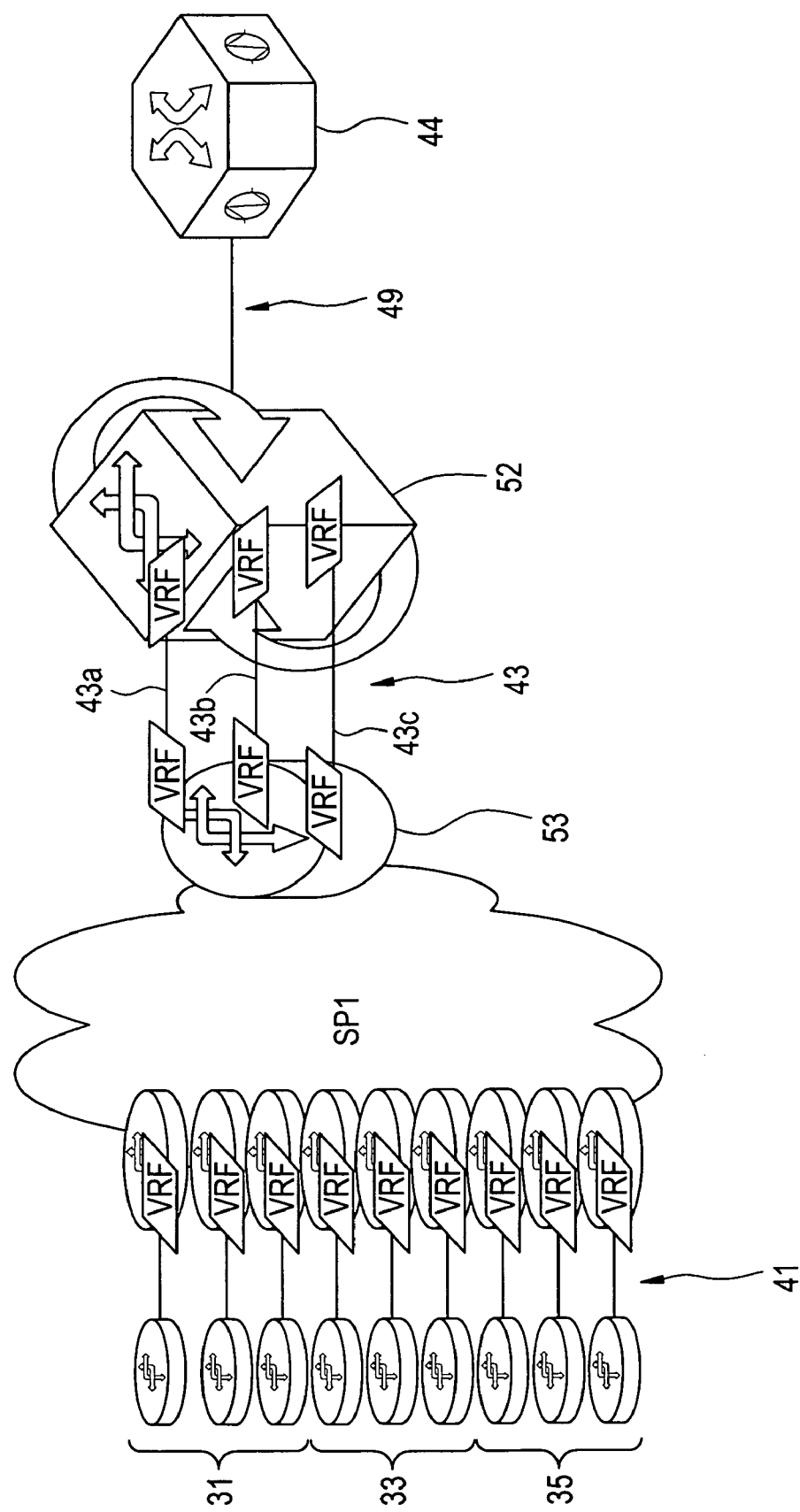
FIG. 4 is a block diagram showing one embodiment of multiple scaling connections capable with the networking architecture interface of the present invention.
Figure 5:
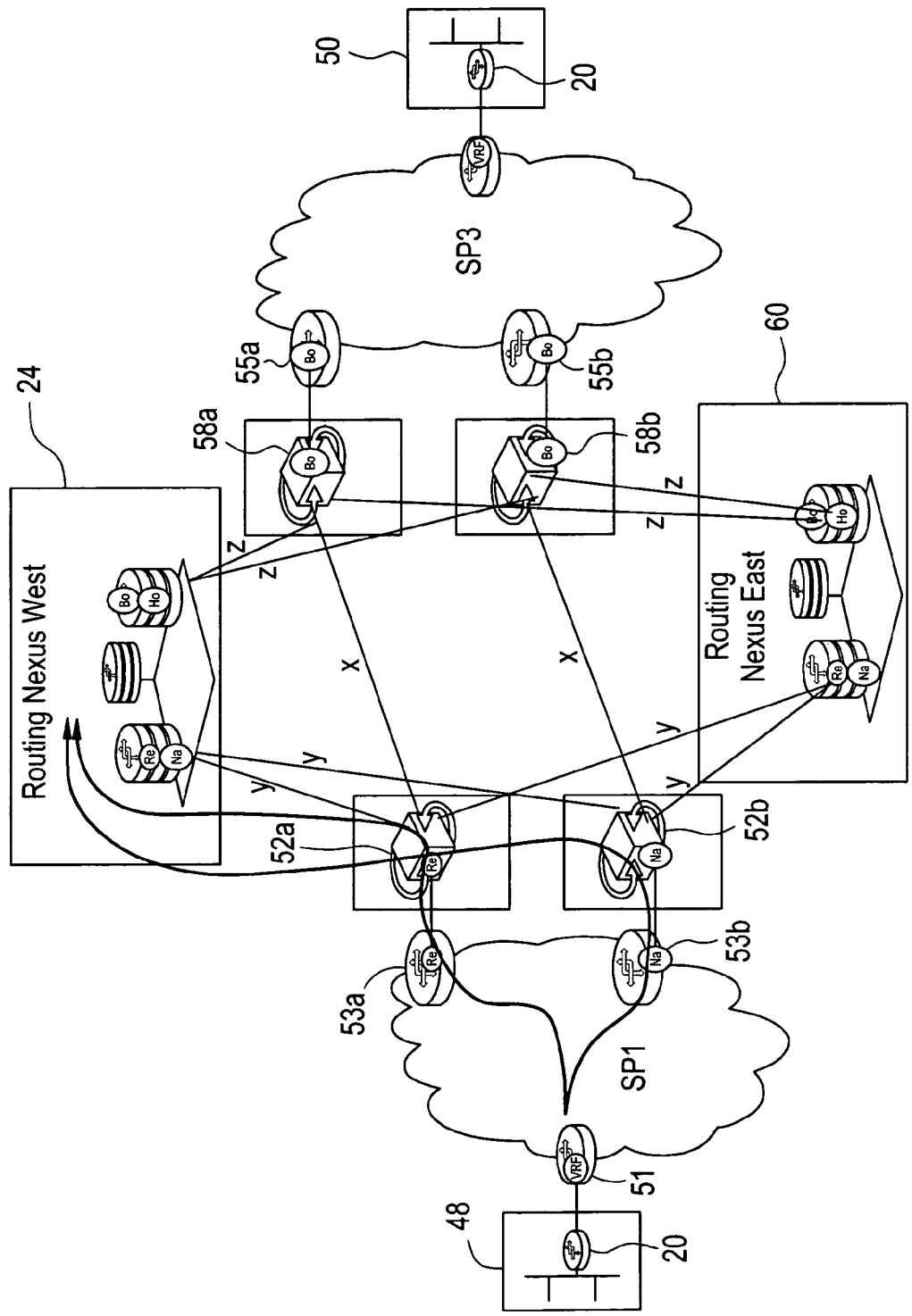
FIG. 5 is a flow diagram showing one embodiment of routing nexus resiliency achieved by the present invention.

A significance of the interconnect domains A, B, C configured in the manner depicted in FIG. 3 is further elaborated with reference to FIGS. 4 and 5, etc.

In the networking architecture and interface illustrated in FIG. 3, for example, the configuration of interface 41 preferably employs layer 1 and layer 2 protocols for packet transmission between the managed router 20 at site 48 and the edge router 51. In a preferred embodiment, the specifications of interface 41 is any Open Systems Interconnection (OSI) link layer 2 protocol operating over any OSI physical layer 1 medium, and may be running a desired routing protocol such as a border gateway protocol (BGP). In addition, the configuration of interface 41 does not permit the forwarding or receiving of MPLS-labeled packets or MPLS-related label distribution protocols, or the forwarding of MPLS VPN membership information. VPN/network membership attributes may comprise route target values, route distinguisher values, and the like.

In addition to the removal of MPLS VPN membership information from interface 41, the removal of interface 41 addressing from the address space of the $SP_1$ backbone results in substantially complete routing separation between site 48 and the $SP_1$ backbone. In other words, as interface 43 shares substantially identical configuration parameters as interface 41, interface 43 serves to logically separate the backbone of $SP_1$ from the gateway 52. Accordingly, the backbone of $SP_1$ essentially spans interconnect domain A, or $SP_1$ Domain A, only. Applying the same principle to interface 45 results in the separation of the $SP_3$ backbone, which spans interconnect domain C, or $SP_3$ Domain C, only. The networking interface of the present invention also facilitates standardized interconnections of one or more dissimilar carrier technologies.

Notably, the gateway 52 has a similar configuration to routers 53, 55 in that the connections between gateway 52 and gateway 58, for instance, across peering points 44, 46 in collocation facility 40, 42, respectively, carry site 48 VPN traffic separated by MPLS labels. As such, the interconnect domain B exhibits similar traffic forwarding properties of $SP_1$ Domain A and $SP_3$ Domain C, with MPLS VPN membership attributes, such as Route Target and Route Distinguisher values, spanning the Interconnect Domain B only. Thus, the networking architecture and interface configuration depicted in FIG. 3 accomplishes substantially complete VPN membership decoupling of the $SP_1$, $SP_2$, $SP_3$ backbones by allowing site traffic from one service provider backbone to pass to another service provider backbone through the intermediary Interconnect Domain B. In this regard, Interconnect Domain B serves as an Interconnect Manager, which uses similar principles as associated with a single service provider backbone in the allocation and provisioning of MPLS VPN membership information to enable the backbones of more than one VPN service provider (i.e. $SP_1$, $SP_3$) to communicate with each other.

What is more, the inventors discovered that by configuring interfaces 43, 45 in a substantially identical manner as interface 41 or 47, using one or more external BGP peering sessions, the following combination of results followed.

First, the peering session is useful, at a minimum, to forward and learn per-VPN route updates between the backbones of $SP_1$ and $SP_3$. Additionally, from a service provider perspective, the peering session is also usable by $SP_1$, for example, to restrict the number of routes advertised to or learned from the $SP_1$ backbone. The service provider $SP_1$ may also use the peering session to summarize route updates advertised to or learned from provider backbones other than $SP_1$, such as $SP_3$.

Second, in instances where a provider backbone is MPLS based, only a single gateway configuration support (as at 52) is required for VPN connectivity to the Interconnect Domain B. Gateway 52 is also configurable to support, for example, IP over ATM (Asynchronous Transfer Mode), IP over Frame Relay, IP over Ethernet, IP over SDH (Synchronous Digital Hierarchy), IP over DSL, and the like.

Third, in instances where a provider backbone is not MPLS based, the same single gateway configuration (as at 52) is the only support required for VPN connectivity to Interconnect Domain B. This is possible due to the gateway transparently supporting IP over any layer 2 based technology.

Fourth, VPN membership decoupling results in a simplified infrastructure support for advanced network services such as multiple service provider VPN multicasting, the process of sending a message simultaneously to more than one destination on the FIG. 3 networking architecture/interface. This simplification results in large measure because each domain boundary (i.e. $SP_1$ Domain A, Interconnect Domain B and $SP_3$ Domain C) has separated Multicast Distribution Trees (MDT). Each MDT is independently configurable and manageable by a service provider, and may use separate multicast routing protocols.

Fifth, because the configuration of each interface 43, 45 is separated at the data link layer or physical layer (layer 2 and layer 1, respectively, in the OSI model), each interface 43, 45 is capable of supporting multiple IP-based traffic flows. This capability in turn allows multiple scaling of site 48 to site 50 connections across one or more service provider backbones.

FIG. 4 shows one embodiment of multiple scaling connections capable with the networking architecture interface of the present invention. Here, multiple sites 31, 33, 35 are hosted by $SP_1$ via interface 41 on the $SP_1$ backbone. The sites grouped as 31 are associated by $SP_1$ to a single interface 43a. Similarly, the sites grouped as 33, 35 are associated by $SP_1$ to a singular interface 43b, 43c, respectively. As all the sites 31, 33, 35 are members of the same virtual private network, the traffic forwarded on to other service provider backbones through the peering point 44 is forwarded from gateway 52 across a single interface connection 49.

As discussed, multiple VPN connections are configurable between router 53 and gateway 52. Moreover, each router 53 to gateway 52 interface 43a, 43b, 43c shares VPN membership information with multiple sites 31, 33, 35, respectively. This association illustrates that two or more sites 31, 33, 35 may communicate with a single interface 43. In addition, multiple router 53 to gateway 52 interface 43a, 43b, 43c may forward and receive traffic across a single MPLS based interface 49.

As a practical matter, generally, there is no limit to the number of peering points and/or gateways and/or networking architecture and/or networking interface and/or service providers in a supply chain VPN. Nor is there any limit to the number of service providers attachable to each peering point or gateway or Interconnect Domain or Interconnect Manager. In a preferred embodiment, one or more carriers are connectable at interconnection points, preferably an interconnect domain, in a network grid. A grid generally refers to a collection of one or more carriers and interconnect points together.

A more detailed description is provided below with reference to FIG. 5, which shows one embodiment of simplified route propagation thereby enhancing routing resiliency.

Each subscriber site 48, 50 generally comprises network equipment, including the subscriber's gateway 20, on the customer's premises. In providing VPN service from site 48 to site 50 in FIG. 5, for instance, the networking architecture is configured to include two service providers $SP_1$, $SP_3$ intermediate each site 48, 50. The plurality of service providers $SP_1$, $SP_3$, gateways 52, 58 and routing nexus 24, 60 forms the supply chain.

As to route propagation, the routing protocols associated with service provider $SP_1$ dynamically determines subscriber data packets flowing from site 48 to site 50. Preferably, the gateway 52a, 52b, 58a, 58b uses BGP route propagation.

More specifically, for a site 48 to communicate with site 50 across the VPN supply chain as depicted, a single VPN route is advertised from site 48, operated by service provider $SP_1$, and forwarded to the gateways 52a, 52b through routers 53a, 53b, respectively. On gateways 52a, 52b, the VPN route is advertised to routing nexus (west) 24 and routing nexus (east) 60.

However, the VPN route advertised by gateway 52a is different to the VPN route that is advertised by gateway 52b. This routing difference is achieved by attaching different route distinguisher values at gateways 52a, 52b to the route associated with site 48. In routing nexus 24, 60, peering routers dedicated to $SP_1$ receive both VPN routes for site 48 from gateways 52a, 52b and forwards both routes to the peering routers dedicated to service provider $SP_3$.

In this manner, the propagation of routing updates between the gateways 52a, 52b, 58a, 58b and the routing nexus 24, 60 is enhanced to include further resilience across potential single points of routing failure within the routing nexus 24, 60 or the routing nexus locations themselves. As described and depicted, this enhanced routing resiliency is accomplished by allowing the west and east routing nexus pair 24, 60 to act in parallel in the controlled forwarding of routing updates between the gateways. Parallel route propagation between service providers $SP_1$, $SP_3$ allows for the failure of any routing nexus device or single routing nexus location without adversely affecting the forwarding of site traffic flows between the gateways to its intended destination(s).

To reiterate, the above-mentioned configuration evidences the plurality of network redundancy of the present invention. As part of the supply chain, there is a north path between transit gateways 52a, 58a, and a south path between transit gateways 52b, 58b. Generally, subscriber traffic may be load-shared across these two connections. In the event of a failure of either of these paths, substantially all subscriber traffic is switched to the other available path.

A noteworthy observation is the use of dynamic layer 3 routing protocols between the gateways 52, 58 across layer 2 technologies. Such use does not perform enterprise or site routing distribution functionalities for the supply chain, as this is handled by the routing nexus 24, 60. Instead, such use is employed to detect substantially any failure in network connectivity.

As earlier described, the main properties of the peering point Ethernet switches 4 are forwarding, tunneling and MPLS traffic engineering. These switches provide one or more Ethernet transport interfaces to the gateways 52a, 52b,

58a, 58b as appropriate, and maps VLANs to MPLS Label Switched Paths (LSPs). A range of Layer 2 VPN transport mechanisms, such as ATM or Frame Relay, may be used by service providers $SP_1$, $SP_3$, for their part of the forwarding path in the virtual private network.

The main properties of the gateways 52a, 52b (and gateways 58a, 58b) are protocol conversion and forwarding. Distribution gateways 52a, 52b provide one or more transport interfaces to the service provider $SP_1$ on the transport side, as well as VLAN Ethernet interfaces to the peering points 44A, 44B on the NPP side.

Figure 6:
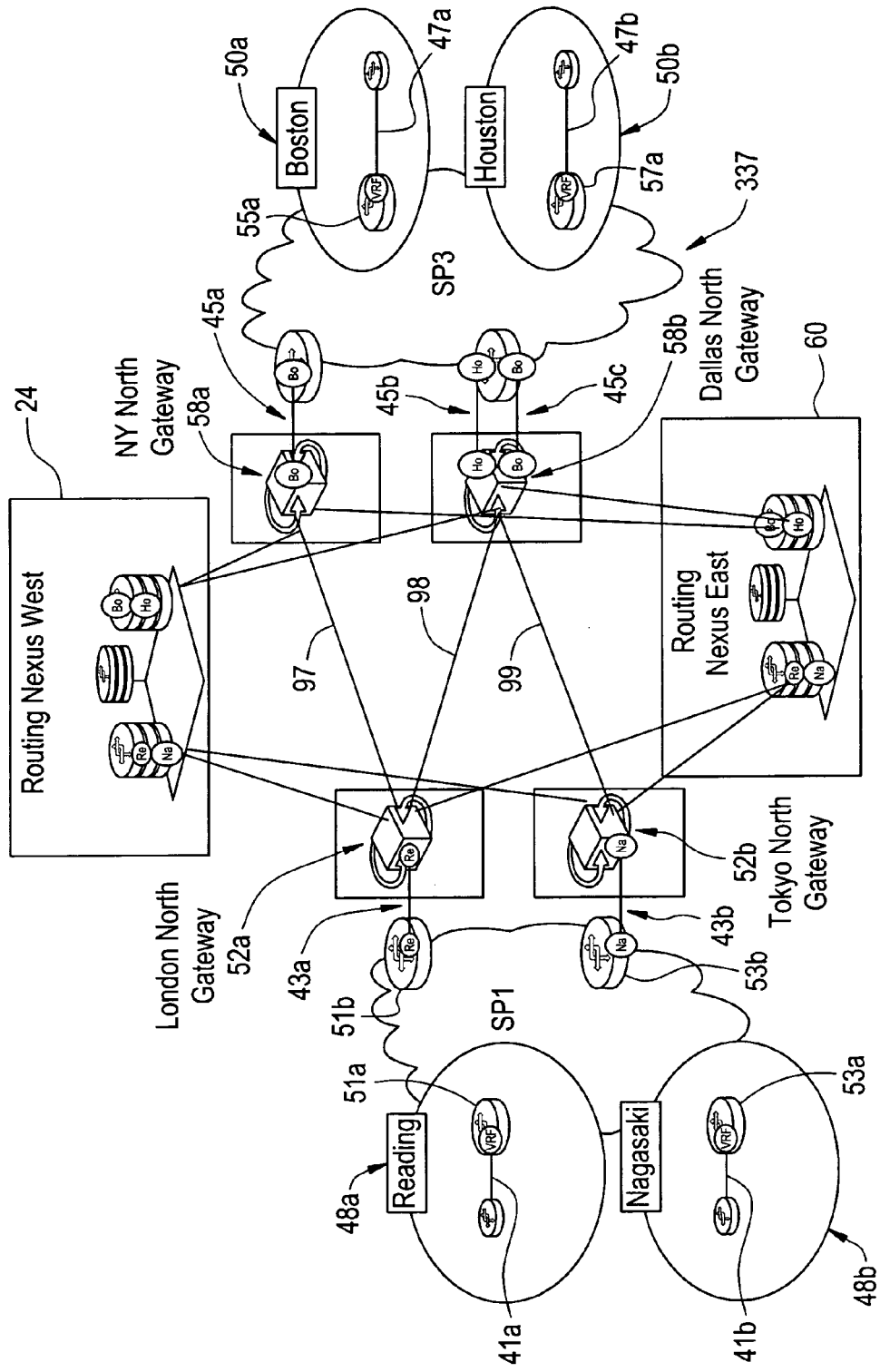
FIG. 6 is a flow diagram showing optimal path routing through one configuration of the networking architecture of the present invention.

As depicted by the x, y, z lines in FIG. 6, the routing nexus 24, 60 are in substantially constant communication with the distribution gateways 52a, 52b, 58a, 58b they support. For redundancy to increase availability of route propagation in the supply chain, as shown, both routing nexus 24, 60 are arranged to operate with the distribution gateways 52a, 52b, 58a, 58b. Preferably, each routing nexus 24, 60 contains a redundant cluster of border routers where at least one router in each nexus 24, 60 is dedicated to each service provider $SP_1$, $SP_3$ and supports route propagation in accordance with route distinguisher and route target values.

Route propagation between distribution gateways 52, 58 is enabled by the routing nexus 24, 60, respectively. Route propagation may be implemented, in part, using conventional techniques facilitated by proprietary route propagation management configuration(s) (developed by the inventors), which allows a service provider to only receive the route(s) it needs. In one embodiment, each routing nexus 24, 60 is preferably equipped with at least one border router per service provider.

Various route propagation techniques for interconnecting service providers may be used in the networking architecture of the present invention. Combined with dynamic MPLS label distribution and IP address mapping configuration, the network architecture of the present invention may support, for example, three inter-service provider routing techniques.

For instance, as shown in FIG. 4, one propagation technique employs a MPLS virtual router interconnection, such as VPN Routing and Forwarding (VRF) to VRF, (as at 43a, 43b, 43c), where two or more virtual private networks are interconnected using BGP protocols and forwarded to the peering point 44 via a single logical interface 49. This technique is generally suitable for all IP based VPN service providers. A major advantage is decoupled secure communication between sites within a single interconnect or service provider domain.

The architecture of the present invention may also support a second route propagation technique, which employs Provider Edge-Autonomous System Border Routers (PE-ASBR). These routers employ EBGP to re-distribute labeled VPN v4 routes from Autonomous System (AS) to AS.

For operational scaling, a Provider Edge Autonomous System Border Router (PE-ASBR) approach to route propagation is the preferred methodology. Under this approach, VPN routes are propagated through a single, multi-protocol exterior border gateway protocol device or devices (for redundancy) from which routes are passed, under desired control, only to service providers that need to receive them, based on VPN participation. Employing this technique greatly reduces the configuration and complexity of the virtual private network.

As to the scalability of the virtual private network of the present invention, because routing and forwarding functions are separated within each peering point 2, the VPN of the present invention is easily scalable to support both increases in the number of VPNs and/or routes created as well as increasing subscriber bandwidth demands. FIG. 5 shows an example of the scaling benefits inherent in interfaces 41, 43 across the backbone of service provider $SP_1$ to the peering point 44.

As to security of the VPN of the present invention, preferable dedication of router(s) to each service provider serves to minimize the probability of a service provider flooding a multi-protocol EBGP session with flapping or invalid routes, for example. Because these routers only learn routes appropriate to the associated service provider, the need for per-service provider access lists, in order to filter routes not destined for the associated service provider's network, is thus substantially eliminated. Additionally, there is substantially no layer 3 addressable component intermediate within the supply chain, another attribute that provides additional isolation and, consequently, security. These advantages may be better appreciated with reference to the next embodiment discussed below.

In the embodiment of FIG. 3, for example, multiple routers form each routing nexus 24, 60. These routers preferably have secure, private in-band connections to distribution gateways 52, 58, for example, which perform the Provider Edge Autonomous System Border Router (PE-ASBR) function. Also, each distribution gateway 52, 58 preferably has dual multi-protocol EBGP sessions to geographically separate border routers, which may be located in the dual geographically distributed routing nexuses.

A visual presentation of how the configuration of interface 43, 45 in a manner substantially identical to interface 41, 47, facilitates a scalable solution for constructing optimized, symmetrical traffic paths between the backbones of service providers $SP_1$, $SP_3$, may be instructive with reference to FIG. 6.

By way of overview, FIG. 6 is a flow diagram showing optimal path routing through the networking architecture of the present invention. More specifically, it describes how traffic flow propagates symmetrically and optimally end-to-end, from non-U.S. sites 48a, 48b hosted by service provider $SP_1$ to U.S. sites 50a, 50b hosted by service provider $SP_3$. An underlying principle shown here is the grouping of sites or site groups per service provider. This allows each back-to-back VPN Routing and Forwarding (VRF) over a single logical interface to be associated either with a subset of sites within the VPN, or with all the sites.

Referring now to FIG. 6, there is shown a pair of service providers $SP_1$, $SP_3$ connected to the 'north' gateways 52a, 52b, 58a, 58b outside and within the United States. While reference is made to the north gateways, it is understood that the same rules apply for the south gateways also.

The sites 48a, 48b hosted by service provider $SP_1$ are grouped as the Reading site group 48a and the Nagasaki site group 48b. Similarly, service provider $SP_3$ has sites grouped as the Boston site group 50a and the Houston site group 50b.

The optimal routing protocols for enterprise traffic requires that: traffic from the Reading site group 48a to the Boston site group 50a traverses interface 97 only; traffic from Reading 48a to Houston 50b traverses interface 98 only; traffic from Nagasaki 48b to Boston 50a traverses interface 99 only; and traffic from Nagasaki 48b to Houston 50b traverses 99 only.

Interfaces 97, 98, 99 between peering points are established per VPN and are configured substantially identical to interface 49 in FIG. 4. These interfaces are configured to be capable of forwarding per VPN traffic from multiple site groups as part of a VPN path.

Reading 48a to Boston 50a communication methodology: The Reading site group 48a requires communication with the Boston site group 50a through gateway 52a. Interface 43a is configured on gateway 52a substantially identical to interface 43 in FIG. 4. In addition, interface 43a terminates at a VRF configured on the gateway 52a located at the London 'north' peering point. Note that service provider $SP_1$ is responsible for allowing all sites associated with the Reading site group 48a to communicate, at a minimum, with any per site group VRF on the gateway 52a that is associated with the Reading site group 48a through interface 43a. Service provider $SP_1$ configures its backbone routers 51a, 51b accordingly to permit this association through the allocation of SP1-owned VPN membership route target and route distinguisher attributes.

Similarly, for service provider $SP_3$, interface 45a is configured between its backbone and gateway 58a. All routes for sites associated with the Boston site group 50a are now learned at the Boston VFR site group on gateway 58a. In addition, all routes for sites associated with the Reading site group 48a are now learned at the Reading VRF site group on gateway 52a.

The Interconnect Manager (not shown), by the controlled advertisement of routing updates through west and east routing nexus 24, 60, allows routes learned through interface 43a to be advertised through interface 45a, and routes learned via interface 45a to be advertised via interface 43a. This per VPN communication is based on the careful allocation and provisioning of VPN membership information by the Interconnect Manager. These VPN membership attributes include route target and route distinguisher values, which are configured on the gateway 52a, 58a as well as at the peering routers in routing nexus 24, 60. The border gateway protocol (BGP) route distribution mechanism for these routes is changed to allow the site traffic to be forwarded through interface 97.

Reading 48a to Houston 50b communication methodology: Since the Reading site group 48a already has an interface 43a configured at the gateway 52a, no further provisioning is required at the $SP_1$ backbone. In order, then, for the Houston site group 50b to communicate with Reading 48a, a new interface 45b must be configured between the backbone of $SP_3$ and the gateway 58b. The Interconnect Manager allocates VPN membership attributes across the gateways 52a, 58b, as well as across the routing nexus 24, 60 that allows route updates to flow through interface 43a and interface 45b. Traffic between interface 43a and interface 45b is now directed through configurations at the routing nexus 24, 60 across interface 98.

Nagasaki 48b to Boston 50a communication methodology: The Nagasaki site group 48b requires communication with the Boston site group 50a through the gateway 52b. Interface 43b is configured on the gateway 52b. Boston 50a requires communication with Nagasaki 48b through gateway 58b. Note that interface 45c is configured on gateway 58b. Here, the Interconnect Manager allocates VPN membership attributes across the gateways 52b, 58b, as well as across the routing nexus 24, 60 that allows route updates to flow between interface 43b and interface 45c. Traffic between interface 43b and interface 45c is now directed via configurations at the routing nexus 24, 60 across interface 99.

Nagasaki 48b to Houston 50b communication methodology: Since the Nagasaki site group 48b already has an interface 43b configured at the gateway 52b, no further provisioning is needed at the backbone of $SP_1$. Similarly, since the Houston site group 50b already has an interface 45c configured at the gateway 58b, no further provisioning is needed at the backbone of $SP_3$. Accordingly, the Interconnect Manager allocates VPN membership attributes across the gateways 52b, 58b, as well as across the routing nexus 24, 60 that allows route updates to flow between interfaces 43b, 45c. Traffic between the interface 43b and interface 45c is now directed via configurations at the routing nexus 24, 60 across interface 99.

Notably, from FIG. 6, once a site group has been configured once per gateway, no additional configurations are required between the service provider's backbone and the gateway. Additionally, for scalability purposes, multiple site group traffic flows may be forwarded across single interfaces between the gateways, as illustrated by the traffic destined for or forwarded from interfaces 45c and 45b (for Houston 50b and Boston 50a, respectively) across interface 99.

In this regard, an objective of the VPN supply chain to allow service provider backbones to connect to multiple interconnect domains, is accomplished. As demonstrated above, this connectivity is beneficial to the service provider because the service provider can optimize multiple VPN symmetrical traffic flows to other service provider backbones that encompass shortest data paths. For each enterprise By way of protocol, generally, there are several rules associated with how a site group communicates or does not communicate with other site groups across the VPN supply chain: For instance, a site group may comprise a minimum of one site with no maximum limit; a site group may only communicate across a peering point with any other site group if it shares the same VPN path; a site group cannot communicate with any other site group across more than a single VPN path; no more than a single VPN Routing and Forwarding (VRF) per site group is configured at a single gateway; multiple site groups can forward traffic across the same logical interface; a site may only belong to a single site group at any point in time; generally, enterprise sites 48a, 48b are grouped by service provider based on topology; (alternatively, sites may be grouped per service provider based on function (i.e. finance, marketing) or any other criteria specific to the site requirement); a VPN path is preferably defined as a path across an interface through the left and right halves of a gateway. A VPN path is preferably defined as the 'left' and/or 'right' interfaces 49 between a gateway 52 located at the 'north' and 'south' NPP 44.

It is important to recognize that the above description describes the characteristics of a multi-lateral interconnect model that provides end-to-end service transparency over multiple potentially multi-homed carriers or service providers.

With respect to the criteria that allows for decoupled secure communication between enterprise sites within a single domain, the following attributes preferably defines site-to-service provider core connectivity: that the router(s) at the enterprise site communicate through a hierarchical peering model where each router does not peer directly, but rather the site router peers with the service provider's backbone router; that all connectivity into the service provider domain from the site's router is IP based and is separated and secured through VPN Routing and Forwarding (VRF) at the service provider's backbone router.

In instances where a service provider collocates a router or gateway at a multi-carrier interconnect peering point, as at Interconnect Domain B, the following attributes preferably defines the gateway configuration that allows for single domain decoupling and security attributes for gateway-to-carrier core communication: that the service provider's routers must communicate across multiple carrier domains through a hierarchical peering model where multiple carrier routers do not peer directly, but rather peer through a gateway; and that all connectivity into the service provider domain from the gateway must be IP based and separated and secured through VPN Routing and Forwarding (VRF) at the carrier routers as well as at the gateway routers.

With respect to the criteria that allows for service provider router-to-router communication within a single MPLS VPN enabled domain, the following attributes preferably defines desirable scaling and communication attributes: that the VPN Routing and Forwarding (VRFs) on service provider routers are not directly connected across a provider's domain, but rather are logically separated via Label Switched Paths (LSPs); and that single LSPs transport multiples of VRF-based traffic across a single provider's domain.

With respect to the criteria that allows for gateway-to-gateway communication across more than one provider peering point, the following attributes preferably defines desirable communication and scaling single domain characteristics: that the VPN Routing and Forwarding (VRF) on gateways must not be directly connected across peering points, but rather are logically separated via LSPs. This separation allows for controlled per-VPN communication between gateways where multiple VRFs across gateways can communicate without multiples of per VPN bilateral connections. This VRF decoupling enables the optimization of site-to-site traffic flows based on shortest data paths. Second, that single Label Switched Paths (LSPs) may transport multiples of VRF-based traffic between gateways, allowing Multi-Protocol Label Switching (MPLS) to be used for the scalable multiplexing of site traffic across singular/single interfaces.

Notably, within a single MPLS VPN-enabled domain, site traffic is logically separated from site route distribution through a provider's use of route reflector hierarchies and backbone routers that forward traffic without learning VPN route updates. This separation of control traffic (via MP-BGP route updates) from forwarding traffic (via MPLS-labeled packet forwarding across backbone routers) allows for a highly scalable architecture capable of supporting large numbers of end-user sites.

As such, the gateway must have single MP-BGP peering sessions into a centralized controlled route distribution hierarchy, with each peer capable of transporting multiples of per-VPN routes. This requirement allows for the scaling of VPN route updates between gateways, as well as avoiding a MP-BGP full mesh. In addition, the peering points need not learn VPN route information in order to forward site traffic.

What is more, the network and interface configuration of the present invention addresses and/or solves the following interconnect challenges:

Security: Since all connections from the gateway to a provider's router are terminated within VRFs, IP addressing at the gateway and subsequently across the peering points may comprise private address space and be logically separated from the provider's address space. The result is elimination of the possibility of Internet-based attacks across the peering points.

Gateway ownership: The gateway is not a part of the provider's core since it connects to the provider's router in substantially the same way it connects to a customer's router. Consequently, the gateway may be located externally from the provider's core at the peering point. Additionally, the gateway may be owned and/or operated by a third party.

Service continuity: Since explicitly labeled MPLS packets can not traverse gateway-to-router connections (as traffic from the gateway to the provider's core is terminated within VRFs at the provider's router), VRFs cannot forward explicitly labeled MPLS packets. This ensures that the provider's core is not exposed to MPLS-based Denial of Service (DoS) attacks.

Routing: As disclosed, a service provider may summarize or restrict route learning at its router(s) in substantially the same manner that the provider may restrict or summarize routing per site VPN connection.

VPN Membership Attributes: Route target and route distinguisher values are not forwarded across gateway-to-router connections. This feature addresses issues associated with VPN topology constructs, route target sharing and route distinguisher overlap, thereby allowing each provider to independently allocate MPLS VPN membership attributes as desired.

Load Balancing: Route target and route distinguisher values are appended to VPN routes per provider at the router connected to the gateway. This allows for providers using route reflectors to load balance traffic across multiples of peering points as well as provide optimized site-to-site traffic paths.

Scalability: The VRF at the gateway may be logically associated to multiples of end-user sites per VPN. Since this association is per provider and is implementable by the provider at the router using existing Operation Support System (OSS), a scalable default-enabled configuration for site-to-site connectivity across multiple providers may be implemented. In addition, this configuration supports meshed peer-to-peer applications such as voice or video over IP.

Multicast: Since provider domains are separated at the router VRF, support for VPN-enabled multicast across provider domains is simplified because carrier Multicast Distribution Tree (MDT) is separate from the gateway MDT.

The many features and advantages of the present invention are apparent from the detailed specification. The above description is intended by the appended claims to cover all such features and advantages of the invention, and all suitable modifications and equivalents fall within the spirit and scope of the invention. For completeness, the above description and drawings are only illustrative of preferred embodiments and is not intended to limit the invention to the exact construction and operation herein illustrated and described.

What is claimed is:

1. An interconnect domain for providing substantially complete decoupled mediation of network services between one or more carriers connected to a communications network, said interconnect domain comprising:
    at least one pair of single interfaces, each interface in the at least one pair configured with substantially the same specification for the removal, from packets transmitted through each interface in the at least one pair, of at least one of network membership information or network distribution protocol label data;
    one or more collocation facilities, each collocation facility having a network device configured to decouple connectivity of one or more carriers to said communications network, and at least one gateway associated with each said network device;
    a route propagation system in communication with at least two gateways in one or more collocation facilities, said propagation system comprising routers where routing information is hosted for distribution through said communications network; and
    a management network in communication with one or more networking elements of said network device and in communication with said route propagation system to facilitate managed operation of said network device and said route propagation system.

2. The interconnect domain according to claim 1 further enabling a gateway to carrier interconnect that allows a carrier to connect to at least one of one or more network devices and one or more pairs of network devices.

3. The interconnect domain according to claim 1 further enabling a gateway to gateway interconnect that allows forwarding of site traffic across one or more single logical interfaces.

4. The interconnect domain according to claim 1 further enabling a gateway to gateway interconnect that allows for scalability of said communications network through separated data forwarding from route distribution.

5. The interconnect domain according to claim 1 further enabling a gateway to gateway interconnect that allows for logical separation of one or more grouping of site routing and forwarding information between gateways.

6. The interconnect domain according to claim 1 further enabling a gateway to carrier interconnect that allows for decoupling of network membership schemas.

7. The interconnect domain according to claim 1 further enabling a gateway to carrier interconnect that allows for substantially secure connections on said gateway to carrier interconnect substantially absent denial of service attack.

8. The interconnect domain according to claim 1 further enabling a gateway to carrier interconnect that allows for separation of one or more gateway interfaces from one or more carrier interfaces.

9. The interconnect domain according to claim 1 further enabling a gateway to carrier interconnect that allows for substantially separated ownership of a gateway from a carrier.

10. The interconnect domain according to claim 1 further enabling a gateway to carrier interconnect allowing for support of advanced network services including multi-carrier network enabled multicast.

11. The interconnect domain according to claim 1 in which said route propagation system creates substantially mirrored route propagation paths allowing for substantially no single point of failure in the hosted routing.

12. The interconnect domain according to claim 1 in which said route propagation system allows for grouping of one or more sites or site groups per carrier.

13. The interconnect domain according to claim 1 in which said route propagation system allows for grouping of one or more sites or site groups per network.

14. The interconnect domain according to claim 1 in which said route propagation system allows traffic from a grouping of one or more sites or site groups to ingress or egress a carrier as desired.

15. The interconnect domain according to claim 1 in which said route propagation system allows one or more carriers each network routing and forwarding over a single interface to be associated with a subset of one or more sites within said communications network or with all network sites.

16. The interconnect domain according to claim 1 further enabling an interconnect that allows a carrier to restrict per VPN the number of routes learned from or advertised to one or more carriers.

17. The interconnect domain according to claim 1 further enabling an interconnect that allows a carrier to summarize per VPN routes learned from or advertised to one or more carriers.

18. The interconnect domain according to claim 1 further enabling an interconnect that allows a carrier to load balance traffic across one or more networking devices.

19. The interconnect domain according to claim 1 further enabling a single gateway router configuration that allows any IP based VPN carrier to connect to a service grid.

20. An interconnect domain for providing performance-based network services, said interconnect domain comprising:
   at least one pair of single interfaces, each interface substantially similarly configured, for the removal, from packets transmitted through each interface, of at least one of network membership information or network distribution protocol label data, resulting in substantially complete routing separation over said interconnect domain;
   one or more collocation facilities, each collocation facility having a network device configured to standardize connectivity of one or more carriers to a communications network, and at least one gateway associated with each said network device;
   a route propagation system in communication with at least two gateways in one or more collocation facilities, said propagation system comprising routers where routing information is hosted for distribution through said communications network; and
   a management network in communication with one or more networking elements of said network device and with the route propagation system to facilitate operation of said network device and said route propagation system.

21. A system for providing substantially measurable network service across an interconnect domain connecting one or more carriers to said interconnect domain, said system comprising:
   one or more carrier domains connected in a way that each carrier domain is logically separated therefrom, each carrier domain comprising a carrier's network backbone, and a pair of routers in communication with said network backbone; and
   at least one interconnect domain comprising at least one collocation facility, which has a network device and one or more gateways associated with said network device, a route propagation system for managing and controlling route propagation functions, a management network in communication with said network device and said route propagation system, and a pair of substantially similar single interfaces for separating at least one of the carrier domain from the interconnect domain, the carrier domain from another carrier domain, or the interconnect domain from another interconnect domain by removing, from packets transmitted through each interface in the pair, at least one of network membership information or network distribution protocol label data.

22. The system according to claim 21, said route propagation system allowing traffic to fail over one of said interconnect domain and carrier domain as directed.

* * * * *